United States Patent
Jeong

(10) Patent No.: US 8,532,709 B2
(45) Date of Patent: Sep. 10, 2013

(54) METHOD AND APPARATUS FOR AUTOMATICALLY CONVERTING PHONE NUMBER WHILE ROAMING

(75) Inventor: Young-Sic Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 571 days.

(21) Appl. No.: 12/526,738

(22) PCT Filed: Dec. 12, 2007

(86) PCT No.: PCT/KR2007/006485
§ 371 (c)(1),
(2), (4) Date: Aug. 11, 2009

(87) PCT Pub. No.: WO2008/100008
PCT Pub. Date: Aug. 21, 2008

(65) Prior Publication Data
US 2010/0029271 A1    Feb. 4, 2010

(30) Foreign Application Priority Data
Feb. 13, 2007  (KR) .................. 10-2007-0015101

(51) Int. Cl.
*H04M 1/00*   (2006.01)

(52) U.S. Cl.
USPC .......... 455/564; 455/432.1; 455/432.2; 455/558

(58) Field of Classification Search
USPC .......... 455/432.1, 432.2, 564, 558, 415
See application file for complete search history.

(56) References Cited

U.S. PATENT DOCUMENTS

| | | | | |
|---|---|---|---|---|
| 5,305,372 | A * | 4/1994 | Tomiyori | 455/564 |
| 5,732,349 | A * | 3/1998 | Sanpei et al. | 455/435.1 |
| 6,360,108 | B1 * | 3/2002 | Rogers | 455/564 |
| 6,941,159 | B2 * | 9/2005 | Tsai et al. | 455/564 |
| 7,062,298 | B2 * | 6/2006 | Bumiller | 455/564 |
| 7,120,469 | B1 * | 10/2006 | Urakawa | 455/564 |
| 7,239,895 | B2 * | 7/2007 | Bumiller | 455/564 |
| 7,245,911 | B2 * | 7/2007 | Kim | 455/432.1 |
| 7,389,126 | B2 * | 6/2008 | Okada | 455/558 |
| 7,418,262 | B2 * | 8/2008 | Kim | 455/432.1 |
| 7,715,829 | B2 * | 5/2010 | Li et al. | 455/417 |
| 2002/0107050 | A1 * | 8/2002 | Rho | 455/564 |
| 2002/0160815 | A1 * | 10/2002 | Patel et al. | 455/564 |
| 2003/0022697 | A1 * | 1/2003 | Chen et al. | 455/564 |
| 2003/0022698 | A1 * | 1/2003 | Chen et al. | 455/564 |
| 2005/0176411 | A1 * | 8/2005 | Taya et al. | 455/414.1 |
| 2006/0046785 | A1 * | 3/2006 | Cagney | 455/565 |
| 2006/0094353 | A1 * | 5/2006 | Nielsen et al. | 455/17 |

FOREIGN PATENT DOCUMENTS

| | | |
|---|---|---|
| JP | 2001-119750 | 4/2004 |
| KR | 10-2005-0072199 | 7/2005 |
| KR | 10-2006-0090870 | 8/2006 |

* cited by examiner

Primary Examiner — Kamran Afshar
Assistant Examiner — Mong-Thuy Tran
(74) Attorney, Agent, or Firm — Staas & Halsey LLP

(57) ABSTRACT

Provided are a method of automatically converting a phone number while roaming using a mobile communication terminal, and a mobile communication terminal using the method. The mobile communication terminal sets an automatic conversion mode, stores at least one phone number, reads a phone number selected by a user from among the at least one stored phone number, converts the read phone number to be suitable for an international phone system of a visited country for connection to a home country if the set automatic conversion mode is ON upon when a calling command is input, and controls every module of the mobile communication terminal such that a call can be made to the converted phone number.

18 Claims, 2 Drawing Sheets

METHOD AND APPARATUS FOR AUTOMATICALLY CONVERTING PHONE NUMBER WHILE ROAMING

CROSS-REFERENCE TO RELATED PATENT APPLICATION

This application claims the benefit under 35 U.S.C. Section 371, of PCT International Application No. PCT/KR2007/006485, filed Dec. 12, 2007, which claimed priority to Korean Patent Application No. 10-2007-0015101, filed Feb. 13, 2007, in the Korean Intellectual Property Office, the disclosures of which are incorporated herein in its entirety by reference.

BACKGROUND OF THE INVENTION

1. Field of the Invention

The present invention generally relates to a method and apparatus for automatically converting a phone number while roaming, and more particularly, to a method of automatically converting a phone number while roaming whereby a roaming user in a foreign country can conveniently call a recipient in a home country using a phone number stored in a mobile communication terminal, and a mobile communication terminal using the method.

This work was supported by the IT R&D program of MIC/IITA.[2006-P10-41, A Study on Standardization for Implementation of Number Portability]

2. Description of the Related Art

Recently, international roaming services for sharing communication base stations among common carriers and providing connection of mobile calls to mutual subscribers have been provided. An international roaming service assigns a unique international roaming number to an individual user in order to enable the user to make a phone call using a mobile communication terminal anywhere around the world.

A conventional international roaming service of a mobile communication terminal is of a service type in which a common carrier in a corresponding country (or visited country) provides a communication service at the request for a roaming service from a mobile communication subscriber, which will hereinafter be referred to as a user, in a home country on condition that a common carrier in the home country makes a roaming contract with the common carrier in the visited country. International roaming services can be classified into automatic roaming services and rental roaming services. An automatic roaming service provides a communication service to a user staying in the visited country in order to allow the user to continue using a mobile communication terminal used in the home country and a rental roaming service provides a communication service of the visited country by renting a separate roaming mobile communication terminal to the user.

After a general process of calling a recipient in a home country using a roaming service in a visited country is described, a conventional technology related to the present invention will be described.

The general process for the roaming user in the visited country to call the recipient in the home country is performed as follows.

The user first inputs a prefix for connection from the visited country to the home country and then inputs a phone number of the recipient, thereby being connected to the recipient in the home country. The prefix is generally composed of an international dialing code of the visited country and a country code of the home country. The international dialing code is 001, 002, 00700, 00365, or the like in Korea and is 011 in the U.S. The international dialing code may vary according to international phone service operators like in Korea. As a result, according to the general process, the user has to input the international dialing code of the visited country and the country code of the home country each time the user calls the recipient in the home country and has to memorize the international dialing code of the visited country and the country code of the home country at all times.

The present invention particularly relates to a way to extend a method of placing a call using a phone number stored in a memory of a mobile communication terminal to a roaming case. Examples of the method of placing a call using a phone number stored in a memory of a mobile communication terminal, which hereinafter will be referred to as a memory-based calling method, may include a first memory-based calling method whereby a user selects a phone number of a desired recipient from a phone number directory displayed on a screen of the mobile communication terminal, a second memory-based calling method whereby the user selects a recent calling phone number or a recent called phone number stored in the memory to place a call, and a third memory-based calling method whereby upon of the user pressing a hot key, a phone number corresponding to the pressed hot key is selected from among phone numbers stored in the memory in order to place a call to a desired recipient.

Conventional methods of calling a recipient in a home country using a phone number stored in a memory of a mobile communication terminal will be described below.

According to a first conventional method, a user searches for a phone number in a memory of a mobile communication terminal and notes down or memorizes the found phone number. The user then inputs the prefix and inputs the noted-down or memorized phone number, to thereby contact a recipient in a home country. However, since this method cannot take advantage of the memory-based calling method, the user has to note down or memorize the found phone number, remember the prefix for every call, and directly input the prefix.

According to a second conventional method, each time a user places a call to a home country, the user downloads software for roaming users over a mobile phone network, executes the downloaded software, and selects a phone number of a recipient in the home country from a phone number directory displayed on a screen of a mobile communication terminal. In other words, the downloaded and executed software converts the selected phone number. However, the second conventional method has the following programs. First, the user has to separately input a command for software downloading to the mobile communication terminal and the software downloading incurs additional cost. Second, for every call, the user has to separately input a command for software execution to the mobile communication terminal. Third, the background screen of the mobile communication terminal changes for dialing after software execution. Fourth, the user cannot select a desired international phone service operator because the user can use only an international phone service operator designated by software.

Therefore, there is a need for a technique for overcoming the above-described problems and allowing a roaming user in a visited country to make the most use of advantages of the memory-based calling method in order to talk with a recipient in a home country.

SUMMARY OF THE INVENTION

The present invention provides a method of automatically converting a phone number while roaming using a mobile communication terminal, whereby when a roaming user in a visited country desires to call a recipient in a home country by selecting a phone number stored in a mobile communication terminal, the stored phone number is automatically converted to be suitable for an international phone system and is dialed, thereby placing a call in the same way as a memory-based calling method used in the home country, and a mobile communication terminal using the method.

According to one aspect of the present invention, there is provided a mobile communication terminal having a function of automatically converting a phone number while roaming. The mobile communication terminal includes a mode setting unit setting an automatic function mode, a storage unit storing at least one phone number, a reading unit reading a phone number selected by a user from among the at least one stored phone number, a conversion unit converting the read phone number to be suitable for an international phone system of a visited country for connection to a home country if the set automatic conversion mode is ON upon input of a calling command, and a control unit controlling every module of the mobile communication terminal such that a call can be made to the converted phone number.

According to another aspect of the present invention, there is provided a method of automatically converting a phone number while roaming using a mobile communication terminal. The method includes setting an automatic function mode, reading a phone number selected by a user from among at least one phone number stored in a memory of the mobile communication terminal, converting the read phone number to be suitable for an international phone system of a visited country for connection to a home country if the set automatic conversion mode is ON upon input of a calling command, and controlling every module of the mobile communication terminal such that a call can be made to the converted phone number.

According to another aspect of the present invention, there is provided a recording medium having recorded thereon a program for executing the method in a mobile communication terminal.

BRIEF DESCRIPTION OF THE DRAWINGS

The above and other features and advantages of the present invention will become more apparent by describing in detail an embodiment thereof with reference to the attached drawings in which.

DETAILED DESCRIPTION OF THE INVENTION

Hereinafter, the present invention will be described in detail with reference to the accompanying drawings. In the following description of the present invention, detailed description of known functions and configurations incorporated herein will be omitted for conciseness and clarity.

The present invention relates to a technique of extending a method of placing a call using a phone number stored in a memory of a mobile communication terminal to a roaming case. Examples of the method of placing a call using a phone number stored in a memory of a mobile communication terminal, which hereinafter will be referred to as a memory-based calling method, may include a first memory-based calling method whereby a user selects a phone number of a desired recipient from a phone number directory displayed on a screen of the mobile communication terminal, a second memory-based calling method whereby the user selects a recent calling phone number or a recent called phone number stored in the memory to place a call, and a third memory-based calling method whereby upon pressing a hot key, a phone number corresponding to the pressed hot key is selected from among phone numbers stored in the memory in order to place a call to a desired recipient.

While the technical spirit of the present invention is described using three methods, i.e., the first through third memory-based calling methods as detailed examples of the memory-based calling method for convenience of explanation, it can be fully understood by those of ordinary skill in the art that the present invention can also be applied to various calling methods using a previously stored phone number in addition to those three methods and combinations thereof.

Figure 1:
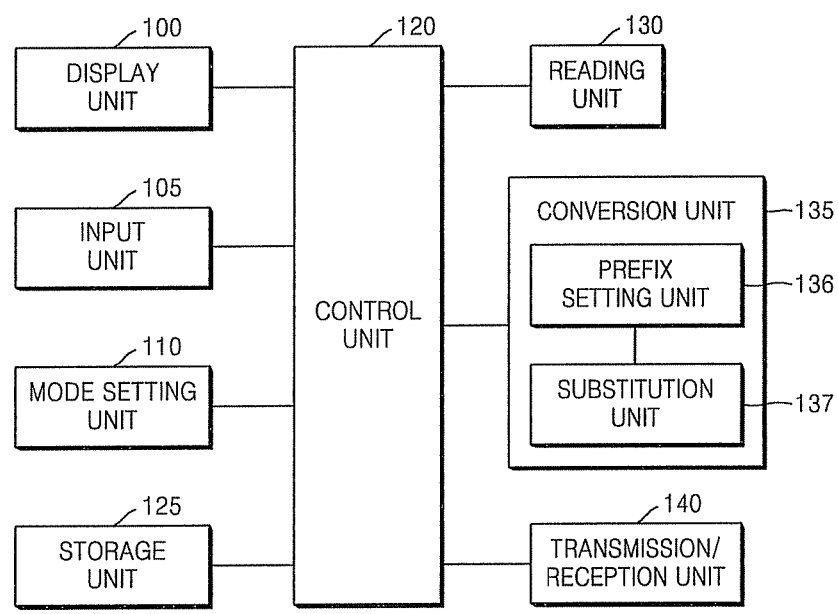
FIG. 1 is a block diagram illustrating the structure of a mobile communication terminal having a function of automatically converting a phone number while roaming, according to an embodiment of the present invention.

FIG. 1 is a block diagram illustrating the structure of a mobile communication terminal having a function of automatically converting a phone number while roaming, according to an embodiment of the present invention.

Referring to FIG. 1, the mobile communication terminal according to the current embodiment of the present invention includes a display unit 100, an input unit 105, a mode setting unit 110, a control unit 120, a storage unit 125, a reading unit 130, a conversion unit 135, and a transmission/reception unit 140.

The display unit 100 displays the state and menus of the mobile communication terminal to a user. The input unit 105 receives user input through various input means such as a plurality of buttons and a wheel. The display unit 100 and the input unit 105 may be implemented with a touch screen.

The mode setting unit 110 sets an automatic conversion mode. The automatic conversion mode basically can be ON where an automatic conversion function is activated or OFF where the automatic conversion function is deactivated. For example, the automatic conversion mode may be set in the following two ways. First, the input unit 105 includes a dedicated button for setting the automatic conversion mode and the mode setting unit 110 sets the automatic conversion mode based on whether or not the dedicated button is pressed. Second, the display unit 100 displays a menu for setting the automatic conversion mode and the mode setting unit 110 sets the automatic conversion mode based on the displayed menu and user input with respect to general buttons included in the input unit 105.

The storage unit 125 stores at least one phone number. More specifically, the storage unit 125 stores a phone number directory including at least one phone number for the first memory-based calling method, stores at least one phone number and a hot number corresponding to the phone number for the second memory-based calling method, and stores at least one calling phone number of called phone numbers in the form of a recent call list for the third memory-based calling method.

Preferably, for the third memory-based calling method, the storage unit 125 stores the calling phone number and the called phone number in a version before being converted. In other words, the calling phone number is stored in the storage unit 125 to be suitable for a phone system of a called country and the called phone number is stored in the storage unit 125 to be suitable for a phone system of a calling country. According to a conventional method whereby a phone number after being converted is stored, a user returning to a home country cannot use a recent call list that has been stored during roaming in a visited country for a memory-based calling method. On the other hand, according to the current embodiment of the present invention, since a phone number before being converted is stored, the user returning to the home country can use the recent calling list stored during roaming in the visited country for the memory-based calling method.

More specifically, when a roaming user in a visited country such as the U.S inputs a phone number of a recipient in Korea, e.g., 02-123-4567, to a mobile communication terminal, the phone number before being converted, i.e., 02-123-4567, is stored in the storage unit 125 even though a converted phone number, e.g., 01182-2-123-4567, is finally called. Thus, according to the current embodiment of the present invention, when the user returns to the home country, in this case, Korea, the user can use the recent calling phone number 02-123-4567 included in the recent call list for the memory-based calling method. In contrast, according to the prior art, since the recent calling phone number included in the recent call list is the converted phone number 01182-2-123-4567, the user cannot make a desired call by selecting the converted phone number.

The reading unit 130 reads a user-selected phone number from the storage unit 125. More specifically, the reading unit 130 detects a phone number selected by a user for a call with a recipient from the stored phone numbers for the first memory-based calling method, detects a phone number corresponding to a hot number input by the user for a call with the recipient from the stored phone numbers for the second memory-based calling method, and detects a phone number selected by the user for a call with the recipient from the stored calling phone number or called phone number for the third memory-based calling method.

The selection and reading processes will now be described in brief. The user selects a phone number stored in the storage unit 125 through the input unit 105 based on details displayed on the display unit 100. The reading unit 130 detects the phone number selected by the user and reads the detected phone number from the storage unit 125 based on details displayed on the display unit 100 and details input to the input unit 105. The selection and reading processes may change according to a user interface used in the mobile communication terminal and it can be fully understood by those of ordinary skill in the art that such changes fall within the scope of the present invention.

If the set automatic conversion mode is ON when the user inputs a calling command, the conversion unit 135 converts the read phone number to be suitable for an international phone system of a visited country for connection to a home country. Referring to FIG. 1, the conversion unit 135 includes a prefix setting unit 136 and a substitution unit 137.

The prefix setting unit 136 sets a prefix for connection from the visited country to the home country. The prefix can be previously set directly by the user through the input unit 105, thereby allowing the user to select a desired international phone service operator. While the prefix may include an international dialing code of the visited country and a country code of the home country, it may also be any combination of a character, a number and a symbol used for phone number conversion required for connection from the visited country to the home country, without being limited to the international dialing code of the visited country and the country code of the home country.

The substitution unit 137 removes a remote area code from the read phone number and inserts the set prefix in front of the read phone number when the automatic conversion mode is ON. In other words, when the automatic conversion mode is ON, the remote area code in the read phone number is substituted with the set prefix. The remote area code is generally '0'.

The transmission/reception unit 140 inputs and outputs transmission/reception signals for communication.

The control unit 120 controls every module of the mobile communication terminal such that a call can be made to the converted phone number. When the automatic conversion mode is OFF, the control unit 120 controls every module of the mobile communication terminal such that a call can be made to the read phone number.

Preferably, the display unit 100 displays the set automatic conversion mode in order to allow the user to conveniently check the setting state of the automatic conversion mode.

Preferably, the display unit 100 displays a phone number to be called in the form of a phone number that does not include the prefix in order to provide a user-friendly environment. In other words, the display unit 100 displays a version before being converted, e.g., 02-123-4567, instead of a complex conversion after being converted, e.g., 01182-2-123-4567, as the phone number to be called.

A case where a Korean A who goes to the U.S on business and applies for a roaming service calls a recipient B in Korea using a Korean phone number 02-123-4567 according to the first memory-based calling method will be taken as an example. In this case, the visited country is the U.S and the home country is Korea.

The Korean A searches for the phone number of the recipient B in a phone number directory stored in a mobile communication terminal through the display unit 100 and the input unit 105 and selects the found phone number of the recipient B through the input unit 105. In this case, the reading unit 130 reads the selected phone number from the storage unit 125 based on user input to the input unit 105 and provides the read phone number to the conversion unit 135. When the currently set automatic conversion mode is ON, the conversion unit 135 substitutes the first number of the provided phone number 02-123-4567, i.e., 0 that is the remote area code, with a prefix for connection from the U.S to Korea, e.g., 01182 or +01182. The conversion result of the conversion unit 135 is 01182-2-123-4567 or +01182-2-123-4567.

The control unit 120 controls every module of the mobile communication terminal illustrated in FIG. 1 such that a call can be made to the recipient B in Korea using the conversion result of the conversion unit 135.

The second memory-based calling method and the third memory-based calling method may be described in the same way as the above description.

Figure 2:
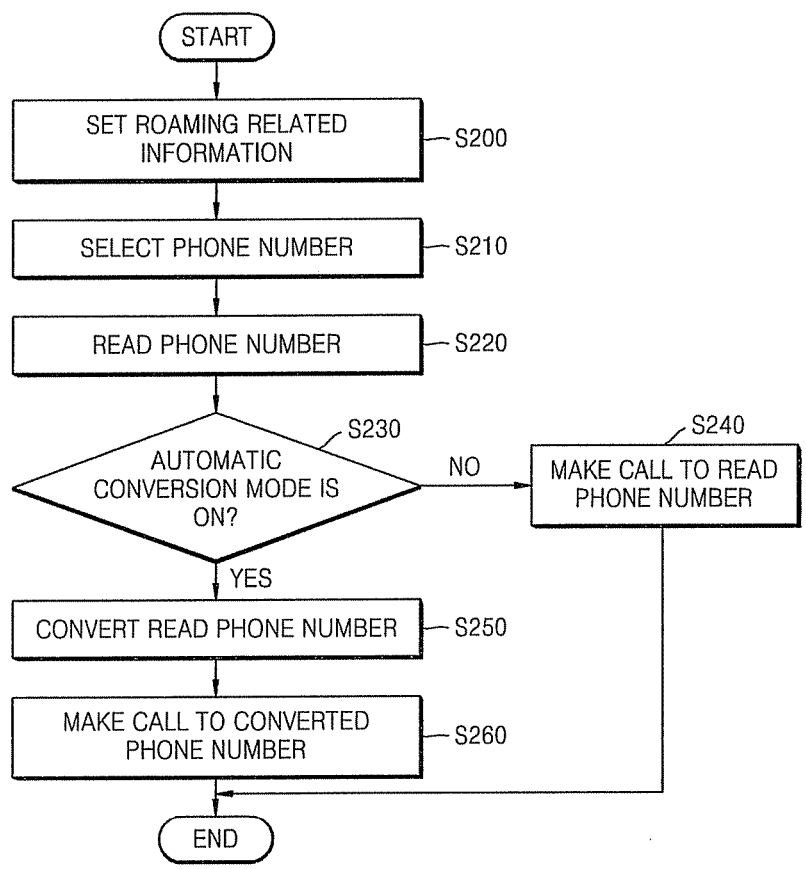
FIG. 2 is a flowchart illustrating a method of automatically converting a phone number while roaming using the mobile communication terminal illustrated in FIG. 1, according to an embodiment of the present invention.

FIG. 2 is a flowchart illustrating a method of automatically converting a phone number while roaming using the mobile communication terminal of FIG. 1, according to an embodiment of the present invention.

Referring to FIG. 2, the method includes operations that are time-serially processed by the mobile communication terminal illustrated in FIG. 1. Thus, the description that has been already made regarding the mobile communication terminal illustrated in FIG. 1 can be applied to the method of automatically converting a phone number while roaming according to the current embodiment of the present invention, and thus may not be repeated.

In operation S200, roaming related information is set. The roaming related information is information required for receiving a roaming service and includes an automatic conversion mode and a prefix used in the present invention. In other words, in operation S200, the automatic conversion mode input by a user is set in the mode setting unit 110 and the prefix is set in the prefix setting unit 136 by the user, a manufacturer of the mobile communication terminal (when a visited country and a home country are previously determined), a common carrier of the home country, or a common carrier of the visited country.

In operation S210, the user selects a phone number using the memory-based calling method described above.

In operation S220, the reading unit 130 reads the phone number selected in operation S210 from the storage unit 125 and then a calling command for making a call to the read phone number is input from the user to the mobile communication terminal.

Upon input of the calling command, if the automatic conversion mode set in the mode setting unit 110 is OFF in operation S230, the control unit 120 controls every module of the mobile communication terminal such that the call can be made to the read phone number in operation S240. If the automatic conversion mode is ON in operation S230, the conversion unit 135 converts the read phone number to be suitable for an international phone system of the visited country for connection to the home country in operation S250.

In operation S260, the control unit 120 controls every module of the mobile communication terminal such that the call can be made to the converted phone number.

According to the present invention, a roaming user in a visited country can call a recipient of a home country using a memory-based calling method used in the home country, thereby improving user convenience.

Moreover, with an automatic conversion function supported in a mobile communication terminal, there is no need to download phone number converting software, thereby simplifying a calling procedure.

Furthermore, with the automatic conversion function supported in a mobile communication terminal, it is not necessary to download phone number converting software, thereby avoiding additional download cost.

Additionally, the user can select a desired international phone service operator.

The user can also use a recent call list stored during roaming for the memory-based calling method after returning to the home country.

The present invention can also be embodied as computer-readable code on a computer-readable recording medium. A computer is a term that includes the concept of a mobile communication terminal.

The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves. The computer-readable recording medium can also be distributed over network coupled computer systems so that the computer-readable code can be stored and executed in a distributed fashion. Functional programs, code, and code segments for implementing the present invention can be easily construed by programmers of ordinary skill in the art.

While the present invention has been particularly shown and described with reference to an embodiment thereof, it will be understood by those of ordinary skill in the art that various changes in form and detail may be made therein without departing from the spirit and scope of the present invention as defined by the following claims.

The invention claimed is:

1. A mobile communication terminal having a function of automatically converting a phone number while roaming, the mobile communication terminal comprising:
    a mode setting unit setting an automatic conversion mode;
    a storage unit storing at least one phone number;
    a reading unit reading a phone number selected by a user from among the at least one stored phone number;
    a conversion unit converting the read phone number to be suitable for an international phone system of a visited country for connection to a home country if the set automatic conversion mode is ON when a calling command is input; and
    a control unit controlling every module of the mobile communication terminal such that a call can be made to the converted phone number,
    wherein the control unit stores a calling phone number in the storage unit to be suitable for a phone system of a called country and a called phone number in the storage unit to be suitable for a phone system of a calling country when roaming from the home country to the visited country and back to the home country, and the reading unit reads a phone number selected by the user between the stored calling phone number or the stored called phone number from the storage unit,
    wherein the calling number and the called number are stored in the storage unit before being converted.

2. The mobile communication terminal of claim 1, wherein the conversion unit comprises:
    a prefix setting unit setting a prefix for connection from the visited country to the home country; and
    a substitution unit substituting a remote area code in the read phone number with the set prefix.

3. The mobile communication terminal of claim 2, wherein the prefix setting unit sets a prefix corresponding to user input.

4. The mobile communication terminal of claim 1, wherein the storage unit stores a phone number directory comprising at least one phone number, and the reading unit reads a phone number selected by the user from the phone number directory from the storage unit.

5. The mobile communication terminal of claim 1, wherein the storage unit stores at least one phone number and hot keys corresponding to the at least one phone number, and the reading unit reads a phone number corresponding to a hot key pressed by the user from the storage unit.

6. The mobile communication terminal of claim 1, further comprising an input unit comprising a dedicated button for setting the automatic conversion mode, wherein the mode setting unit sets the automatic conversion mode based on whether or not the dedicated button is pressed.

7. The mobile communication terminal of claim 1, further comprising a display unit displaying a menu for setting the automatic conversion mode, wherein the mode setting unit sets the automatic conversion mode based on the displayed menu and user input.

8. The mobile communication terminal of claim 1, wherein the control unit controls every module of the mobile communication terminal such that the call can be made to the read phone number if the automatic conversion mode is OFF.

9. The mobile communication terminal of claim 1, further comprising a display unit displaying a version of a phone number to be called before the phone number is converted by the conversion unit.

10. A method of automatically converting a phone number while roaming using a mobile communication terminal when roaming from a home country to a visited country and back to the home country, the method comprising:

setting an automatic conversion mode;

reading a phone number selected by a user from among at least one phone number stored in a memory of the mobile communication terminal;

converting the read phone number to be suitable for an international phone system of the visited country for connection to the home country if the set automatic conversion mode is ON when a calling command is input;

controlling every module of the mobile communication terminal such that a call can be made to the converted phone number; and storing a calling phone number in the memory to be suitable for a phone system of a called country and a called phone number in the memory to be suitable for a phone system of a calling country, and the reading of the phone number comprises reading a phone number selected by the user between the stored calling phone number or the stored called phone number from the memory, wherein the calling number and the called number are stored in the storage unit before being converted.

11. The method of claim 10, wherein the conversion of the read phone number comprises:

setting a prefix for connection from the visited country to the home country; and substituting a remote area code in the read phone number with the set prefix.

12. The method of claim 11, wherein the setting of the prefix comprises setting a prefix corresponding to user input.

13. The method of claim 10, wherein the reading of the phone number comprises reading a phone number selected by the user from the phone number directory from the memory.

14. The method of claim 10, wherein the reading of the phone number comprises reading a phone number corresponding to a hot key pressed by the user from the memory.

15. The method of claim 10, wherein the setting of the automatic conversion mode comprises setting the automatic conversion mode based on whether or not the dedicated button is pressed.

16. The method of claim 10, further comprising displaying a menu for setting the automatic conversion mode, wherein the setting of the automatic conversion mode comprises setting the automatic conversion mode based on the displayed menu and user input.

17. The method of claim 10, wherein the controlling of every module comprises controlling every module of the mobile communication terminal such that the call can be made to the read phone number if the automatic conversion mode is OFF.

18. The method of claim 10, further comprising displaying a version of a phone number to be called before the phone number is converted.

* * * * *